United States Patent Office 3,796,645
Patented Mar. 12, 1974

3,796,645
ELECTROLYTIC RUST AND SCALE REMOVAL IN ALKALINE SOLUTION
Shigeru Fujita, Omiya, and Shinshichi Tamura, Tokyo-to, Japan, assignors to Japan Metal Finishing Company Limited, Tokyo-to, Japan
No Drawing. Filed Sept. 18, 1970, Ser. No. 73,588
Claims priority, application Japan, Sept. 30, 1969, 44/77,891
Int. Cl. C23b 1/00, 1/04, 1/06
U.S. Cl. 204—141.5
7 Claims

ABSTRACT OF THE DISCLOSURE

Rust and scale on ferrous metal articles are electrolytically removed in an alkaline solution containing, as an additive, at least one substance selected from among sulfur and sulfur compounds capable of dissociating in an alkaline solution to produce sulfur containing ions, the electrolytic process being carried out by the periodic reverse electrolytic method in which the anode and cathode are alternately and periodically changed over.

BACKGROUND OF THE INVENTION

This invention relates generally to techniques for removing rust and scale from metal surfaces and electrochemical processes and more particularly to alkaline electrochemical removal of rust and scale. More specifically, the invention relates to a new process for electrolytically removing foreign matter, including oxides of iron, from ferrous metals in an alkaline bath without the use of a cyanide.

In general, when ferrous metals are exposed to air or subjected to heat treatment, corrosion such as rust and scale forms on their surfaces. Such rust and scale not only impair the exterior appearance of the metals but also impair various characteristics thereof and, moreover, give rise to difficulties in subsequent processing and working of the metals. Accordingly, it is necessary to remove such rust and scale as thoroughly as possible.

Removal of rust an scale can be broadly divided into processes with an acidic solution and processes with an alkaline solution. While an acidic-solution process is economical because of the low cost of the chemicals used and is easily carried out, it is accompanied by difficulties such as severe attacking of the base metal, formation of carbon smut, and hydrogen embrittlement of the base metal due to the hydrogen which is generated at the same time.

An acidic-solution process in which these difficulties have been overcome has not heretofore been developed, as far as we are aware. Instead, removal of rust and scale with alkaline solutions is a technique which has recently begun to attract attention in the art. This alkaline process for removal of foreign matter is advantageous in that the base metal in most cases is not attacked, in that hyrogen embrittlement does not always occur, and in that formation of carbon smut is not observable.

Furthermore, techniques in the removal of rust and scale from ferrous metals may be classified according to process, the most common of which is the immersion or dip process in which the material to be treated is immersed in a rust and scale removing path, the electrochemical or electrolytical process in which the material to be treated and an electrode are placed in a rust and scale removing bath and a voltage is impressed across the material and electrode thereby to cause an electric current to flow therebetween.

Of these processes, the electrolytic process is the most positive and can effectively remove rust and scale which cannot be removed by the other processes.

Accordingly, it can be said that removal of rust and scale by subjecting the articles to electrolysis in alkaline aqueous solution is the most suitable process. This process, however, has required the use of an alkaline substance such as a caustic alkali, and a chelating agent or a complexing agent as well as toxic cyanides in large quantities. The use of these substances has been and is still a great drawback of this process in the known state of the art.

A representative example of a bath used heretofore in this process is an aqueous solution each liter of which contains 100 grams (g.) of caustic soda (sodium hydroxide), 60 g. of sodium cyanide, and 60 g. of sodium gluconate. By using a large quantity of a cyanide in this manner, the rust and scale can be rapidly removed by electrolysis, and moreover, the bath life is prolonged, whereby a large number of metal workpieces can be effectively processed by a bath of a certain volume. Moreover, the electrolytic conditions are not overly rigid, permitting operation throughout a considerably broad range thereof, whereby effective operational control is easily attained.

When the cyanide is used in a quantity greater than that set forth above, e.g., of the order of from 80 to 100 g., the effectiveness thereof can be increased even more, but, conversely, when the quantity thereof is decreased, the effective action tends to decrease remarkably, whereby the process with such reduced quantity of the cyanide is not industrially desirable.

Thus, cyanides are extremely effective compounds in alkaline electrolytic rust and scale removal. However, cyanides are highly toxic and fatal even in minute quantities to humans and animals. Consequently, the use of a cyanide in a large quantity as set forth above in alkaline electrolytic rust and scale removal gives rise to the problem of disposal of the alkaline electrolytic bath into streams and rivers which would lead to pollution and public hazards.

For this reason, and because of the recent concern over environmental pollution, dumping of such solutions in their original state is prohibited in many areas, there being requirements for treatment of such solutions until the cyanides have been rendered into forms harmless to humans and other living organisms. Such treatment, however, entails considerable expense for necessary facilities.

In order to avoid this high expense, alkaline electrolytic rust and scale removal processes in which cyanides are not used have been proposed (for example, as disclosed in Japanese patent publication No. 2,765/1968). These proposed processes, however, have been accompanied by difficulties such as relatively slow rate of rust and scale removal and short operation life of the bath whereby only a small number of metal articles can be effectively processed with a certain quantity thereof, and have not been industrially practical.

As a result of research, we have discovered that, by using sulfur or a sulfur compound capable of dissociating in alkaline solution to produce sulfur-containing ions in the process solution, it is possible to obtain electrolytic rust and scale removal action of an effectiveness almost equal to that obtainable through the use of a cyanide.

SUMMARY OF THE INVENTION

It is an object of the present invention to provide a process which removes electrolytically rust and scale from ferrous metal in an alkaline aqueous solution containing, as an additive for promoting electrolysis, sulfur or a sulfur compound which dissociates in an alkaline solution to produce sulfur-containing ions.

Another object of the invention is to provide an alkaline solution suitable for use in the above stated process.

According to the present invention, briefly, summarized, there is provided an alkaline electrolytic process for rust and scale removal, which process is characterized, by subjecting the articles to electrolysis in an alkaline solution containing, as an additive, one or more substances selected from sulfur and sulfur compounds capable of dissociating in an alkaline liquid to produce sulfide ions.

According to the present invention, in another aspect thereof, there is provided an alkaline electrolytic rust and scale removal solution.

The nature, details, and utility of the invention will be more clearly apparent from the following detailed description beginning with general considerations and concluding with specific examples of practice constituting preferred embodiments of the invention.

DETAILED DESCRIPTION

The additives suitable for use in accordance with the invention, in addition to sulfur as a simple substance or elements, are sulfur compounds capable of dissociating chemically or electrochemically in an alkaline solution to produce sulfide ions. Examples of these additives which we have found to be suitable are as follows:

(1) Sulfur (element)
(2) Metal sulfides
(3) Aliphatic nitrogen sulfur compounds—
   (a) Thiourea and derivatives thereof
   (b) Thiocarbamates
   (c) Thioamines
   (d) Thioamides
   (e) Thiuramsulfides
(4) Aromatic nitrogen sulfur compounds—Mercaptobenzothiazoles
(5) Thio-acid and salts thereof—
   (a) Thio organic acids and salts thereof
   (b) Thiocyanates
   (c) Salts of thiosulfuric acid and dithionous acid
(6) Non-metallic sulfides—Carbon disulfide, etc.
(7) Sulfur-containing proteins—Cystine, etc.

The sulfur or any of its compounds as indicated above is used in conjunction with an alkaline substance such as a caustic alkali and complexing agents or chelating agents. The quantity of this additive to be added is of the order of from 0.1 to 3 g. per liter of the solution.

We have found that gluconates and gluco-heptonates are especially suitable for use as complexing agents according to the invention. Other complexing agents sometimes have disadvantageous effects such as lengthening of the rust and scale removal time and discoloration of the entire workpiece surface with black smut. Dewaxing or degreasing of the metal surface can also be accomplished by adding a surfactant to the solution.

By using one or more rust and scale removal solutions of the above described character in the rust and scale removal process according to the invention, rust, scale and oxide on metal surfaces can be removed rapidly, and a large quantity of metal materials can be effectively processed without the use of a cyanide. This rust and scale removal, moreover, can be carried out with a relatively low current density. These advantageous features of the process solution of the invention are born out quantitatively by the results of actual practice.

For example, when a certain metal workpiece requires a process time of the order of 10 minutes for rust and scale removal with a solution not containing a cyanide and not containing an additive according to the invention, the same workpiece can be processed according to the invention in a remarkably short time of the order of from 1.5 to 2.0 minutes. Furthermore, whereas only a few sheets of a metal can be processed by a known process with a certain quantity of solution, from 20 to 30 sheets of the same metal can be processed effectively by the process of the invention with the same quantity of the process solution. Moreover, whereas a relatively high current density of the order of from 10 to 30 amperes/$dm.^2$ is necessary without additives, effective rust and scale removal can be carried out with a low current density of the order of from 4 to 5 amperes/$dm.^2$ by the process of the invention.

Another feature of the invention is that since a cyanide is not used in the process there is no dangerous condition therein, and there is no necessity of facilities for disposal of solutions containing a cyanide.

While the electrolysis can be carried out by a method such as the so-called cathode electrolytic method or the anode electrolytic method, the so-called "periodic reverse electrolytic method" in which the anode and cathode are alternatively and periodically changed over has been found to be most suitable in the practice of the present invention.

In order to indicate still more fully the nature and utility of the invention, the following specific examples of practice constituting preferred embodiments of the invention are set forth, it being understood that these examples are presented as illustrative only and that they are not intended to limit the scope of the invention.

In each of these examples, the material processed was a uniformly dewaxed and degreased iron sheet which had been heated with a burner and colored with a temper color. In each case, the process was carried out by the periodic reverse method with a pulse interval of 3 seconds, with a current density of 4 amperes/$dm.^2$, at a temperature of 50 degrees C. The process was carried out with the following bath compositions, and excellent results were obtained in all cases.

EXAMPLE 1

|  | G./liter |
|---|---|
| Caustic soda | 150 |
| Sodium gluconate | 30 |
| Sulfur | 0.2 |

The metal surface became clean in approximately 100 to 120 seconds. In contrast, a process time of approximately 9 minutes was required in the case where sulfur was not added to the process liquid.

EXAMPLE 2

|  | G./liter |
|---|---|
| Caustic soda | 150 |
| Sodium gluconate | 30 |
| Sodium sulfide | 1.7 |

The temper color removal time was 90 seconds.

EXAMPLE 3

| | | |
|---|---|---|
| Caustic soda | g./liter | 150 |
| Sodium gluconate | do | 30 |
| Thiourea | do | 0.5 |
| Surfactant | | Small quantity |

The temper color removal time was from 90 to 150 seconds.

EXAMPLE 4

| | | |
|---|---|---|
| Caustic soda | g./liter | 150 |
| Sodium gluconate | do | 30 |
| Sodium diethyldithiocarbamide | do | 0.17 |
| Surfactant | | Small quantity |

The temper color removal time was approximately 180 seconds.

EXAMPLE 5

| | G./liter |
|---|---|
| Caustic soda | 150 |
| Sodium gluconate | 30 |
| Ethylene thiourea | 0.11 |

The temper color removal time as approximately 120 seconds.

EXAMPLE 6

| | | |
|---|---|---|
| Caustic soda | g./liter | 150 |
| Sodium gluconate | do | 30 |
| Thioacetoamide | do | 0.5 |
| Surfactant | | Small quantity |

The temper color removal time was approximately 120 seconds.

EXAMPLE 7

| | | |
|---|---|---|
| Caustic soda | g./liter | 150 |
| Sodium gluconate | do | 30 |
| Tetramethylthiuram disulfide | do | 0.3 |
| Surfactant | | Small quantity |

The temper color removal time was approximately 120 seconds.

EXAMPLE 8

| | G./liter |
|---|---|
| Caustic soda | 150 |
| Sodium gluconate | 30 |
| 2-mercaptobenzothiazole | 0.6 |

The temper color removal time was approximately 120 seconds.

EXAMPLE 9

| | G./liter |
|---|---|
| Caustic soda | 150 |
| Sodium gluconate | 30 |
| Thioglycollic acid | 1 |

The temper color removal time was approximately 240 seconds.

EXAMPLE 10

| | G./liter |
|---|---|
| Caustic soda | 150 |
| Sodium gluconate | 30 |
| Sodium thiocyanate | 0.1 |

The temper color removal time was approximately 90 seconds.

EXAMPLE 11

| | G./liter |
|---|---|
| Caustic soda | 170 |
| Sodium gluconate | 33 |
| Sodium thiosulfate | 1.7 |

The temper color removal time was approximately 120 seconds.

EXAMPLE 12

| | | |
|---|---|---|
| Caustic soda | g./liter | 150 |
| Sodium gluconate | do | 30 |
| Carbon disulfide | cc./liter | 3 |

The temper color removal time was approximately 120 seconds.

EXAMPLE 13

| | G./liter |
|---|---|
| Caustic soda | 150 |
| Sodium gluconate | 30 |
| Cystine | 0.8 |

The temper color removal time was approximately 120 seconds.

EXAMPLE 14

| | G./liter |
|---|---|
| Caustic soda | 150 |
| Sodium gluco heptonate | 50 |
| Sodium thiosulfate | 2.5 |

The temper color removal time was approximately 120 seconds.

EXAMPLE 15

| | G./liter |
|---|---|
| Caustic soda | 160 |
| Sodium gluconate | 34 |
| Thiourea | 0.24 |
| Thiomalic acid | 0.5 |

The temper color removal time was approximately 90 seconds.

EXAMPLE 16

| | G./liter |
|---|---|
| Caustic soda | 160 |
| Sodium gluconate | 30 |
| Rochelle salt | 30 |
| Sodium thiosulfate | 1.5 |

The temper color removal time was approximately 120 seconds.

EXAMPLE 17

| | G./liter |
|---|---|
| Caustic soda | 160 |
| Rochelle salt | 35 |
| Sodium thiosulphate | 1 |

The temper color removal time was approximately three to four minutes.

As described above, it should be understood that two or more sulfur components or two or more complexing agents, can be used together in the method, according to the invention.

We claim:

1. An alkaline electrolytic rust and scale removal process which comprises subjecting a material to be processed to electrolytic rust and scale removal in an aqueous alkaline rust and scale removal solution free from cyanide containing, as an additive, at least one sulfur compound capable of dissociating in an aqueous alkaline solution to produce sulfur-containing ions and selected from the group consisting of metal sulfides, thiourea and derivatives thereof, thiocarbamates, thioamines, thioamides, thiuramsulfides, mercaptobenzothiazoles and other aromatic nitrogen sulfur compounds, thio-organic acids and salts thereof, thiocyanates, salts of thiosulfuric acid, salts of dithionous acid, carbon disulfide and other non-metallic sulfides and cystine and other sulfur-containing proteins.

2. An alkaline electrolytic rust and scale removal process as claimed in claim 1 in which said alkaline rust and scale removal solution contains a caustic alkali and at least one substance selected from the group consisting of gluconates, gluco-heptonates, and other water soluble complexing and chelating agents and surfactants.

3. An alkaline electrolytic rust and scale removal process as claimed in claim 1 in which said electrolytic rust and scale removal is carried out by the periodic reverse electrolytic method in which the anode and cathode are alternatively and periodically changed over.

4. A process according to claim 1 wherein the additive is present in an amount of 0.1 to 3.0 grams/liter of the alkaline solution.

5. A process according to claim 4 wherein an alternating current of about 4 to 5 amperes/dm.$^2$ is employed.

6. An alkaline liquid for electrolytic removal of rust and scale from metal surfaces comprising an aqueous alkaline solution free from cyanide and at least one sulfur compound capable of dissociating in an aqueous alkaline solution to produce sulfur-containing ions and selected from the group consisting of metal sulfides, thiourea and derivatives thereof, thiocarbamates, thioamines, thioamides, thiuramsulfides, mercaptobenzothiazole and other aromatic nitrogen sulfur compounds, thio-organic acids and salts thereof, thiocyanates, salts of thiosulfuric acid, salts of dithionous acid, carbon disulfide and other non-metallic sulfides, and cystine and other sulfur-containing proteins.

7. A liquid according to claim 6 wherein the sulfur compound is present in an amount of 0.1 to 3.0 grams/liter.

References Cited

UNITED STATES PATENTS

| | | | |
|---|---|---|---|
| 855,667 | 6/1907 | Reed | 204—145 R |
| 1,600,355 | 9/1926 | Otis et al. | 204—145 R |
| 3,293,159 | 12/1966 | Mekjean et al. | 204—145 F |
| 1,369,271 | 2/1921 | Edison | 204—141 |
| 3,666,667 | 5/1972 | Wieczorek | 252—87 |

FOREIGN PATENTS

| | | | |
|---|---|---|---|
| 769,913 | 3/1957 | Great Britain | 204—145 R |
| 844,227 | 8/1960 | Great Britain | 204—145 R |
| 771,314 | 3/1957 | Great Britain | 204—145 R |
| 1,082,409 | 11/1967 | Great Britain | 204—145 R |
| 991,556 | 5/1965 | Great Britain | 204—145 R |
| 1,114,070 | 9/1961 | Germany | 204—145 R |

THOMAS M. TUFARIELLO, Primary Examiner

U.S. Cl. X.R.

204—145 R